(12) United States Patent
Schwarz

(10) Patent No.: US 9,563,762 B2
(45) Date of Patent: *Feb. 7, 2017

(54) METHOD FOR GENERATING AN IDENTIFIER

(71) Applicant: BUNDESDRUCKEREI GmbH, Berlin (DE)

(72) Inventor: Carsten Schwarz, Berlin (DE)

(73) Assignee: BUNDESDRUCKEREI GmbH, Berlin (DE)

( * ) Notice: Subject to any disclaimer, the term of this patent is extended or adjusted under 35 U.S.C. 154(b) by 11 days.

This patent is subject to a terminal disclaimer.

(21) Appl. No.: 14/804,770

(22) Filed: Jul. 21, 2015

(65) Prior Publication Data
US 2015/0324572 A1 Nov. 12, 2015

Related U.S. Application Data

(63) Continuation of application No. 13/260,762, filed as application No. PCT/EP2010/058181 on Jun. 10, 2010, now Pat. No. 9,104,847.

(30) Foreign Application Priority Data

Jun. 29, 2009 (DE) .................. 10 2009 027 268

(51) Int. Cl.
*G06F 21/34* (2013.01)
*H04L 29/06* (2006.01)
(Continued)

(52) U.S. Cl.
CPC .............. *G06F 21/34* (2013.01); *G06F 21/31* (2013.01); *H04L 9/0827* (2013.01); *H04L 9/30* (2013.01);
(Continued)

(58) Field of Classification Search
CPC .......... G06F 21/31; G06F 21/34; H04L 63/06; H04L 63/062; H04L 63/064; H04L 2463/062; H04L 2209/805; H04L 9/30; H04L 9/0825; H04L 9/0827
(Continued)

(56) References Cited

U.S. PATENT DOCUMENTS 8,222,989 B2 * 7/2012 Ziska .................. B60R 25/2018
340/5.1
2004/0123098 A1 6/2004 Chen
(Continued)

FOREIGN PATENT DOCUMENTS

DE 103 42 710 5/2005

OTHER PUBLICATIONS

Anonymous and Traceable Communication Using Tamper-Proof Device for Vehicular Ad Hoc Networks, Kim et al, IEEE 2007.*
(Continued)

*Primary Examiner* — Luu Pham
*Assistant Examiner* — Jahangir Kabir
(74) *Attorney, Agent, or Firm* — Leveque IP Law, P.C.

(57) ABSTRACT

The invention relates to a method for generating an identifier for identifying a pair, wherein the pair comprises a cryptographic device and a computer system $(1, 2, \ldots, i, \ldots I)$, wherein the cryptographic device has a first secret key, wherein a second secret key (118.i) is associated with the computer system, wherein a blocking system (120) for accessing the second secret key of the computer system is provided, wherein the blocking system has a third secret key, and wherein the following steps are carried out for generating the identifier: generating a second public key (116.i) from the second secret key and a third public key (128) associated with the third secret key by means of the blocking system, transmitting the second public key (116.i) to the
(Continued)

computer system (i), and generating the identifier from the first secret key and the second public key, using the cryptographic device.

14 Claims, 5 Drawing Sheets

(51) Int. Cl.
    *H04L 9/08*     (2006.01)
    *H04L 9/30*     (2006.01)
    *G06F 21/31*     (2013.01)

(52) U.S. Cl.
    CPC ......... *H04L 63/06* (2013.01); *H04L 2209/805* (2013.01); *H04L 2463/061* (2013.01)

(58) Field of Classification Search
    USPC .................................................. 380/278, 282
    See application file for complete search history.

(56) References Cited

U.S. PATENT DOCUMENTS

| | | |
|---|---|---|
| 2005/0117745 A1 | 6/2005 | Lee et al. |
| 2008/0141027 A1 | 6/2008 | Kim et al. |
| 2010/0043056 A1 | 2/2010 | Ganapathy |

OTHER PUBLICATIONS

Improving the Robustness of Wireless Device Pairing Using Hyphen-Delimited Numeric Comparison, Karole et al, IEEE 2008.*
Federal Office for Information Security, Technical Guideline TR-03127 Architecture Electronic Identiy Card and Electronic Resident Permit, Version 1.13, Mar. 10, 2011.
Kim et al., "Design and Implementation of a Private and Public Key Crypto Processor and Its Application to a Security System", IEEE, 2004.
"Advanced Security Mechanisms for Machine Readable Travel Documents Extended Access Control (EAC), Password Authenticated Connection Establishment (PACE), and Restricted Identification (RI)", Advanced Security Mechanisms for Machine Readable Travel Documents, Bundesame Fur Secherheit in Der Informationstechnik, DE, No. Version 2.0, Oct. 27, 2008, pp. 1-99, XP007914803.
"Tecnische Richtlinie TR-03127 Architektur Elektronischer Personalausweis", Technische Richtlinie TR-03127, Bundesamt Fur Sicherheit in Der Informationstechnik, DE, No. Version 0.5, Apr. 17, 2009. pp. 1-37, XP007914804.
Menezes, Al et al., "Chapter 13: Key Management Techniques ED", [Online], Oct. 1, 1996, Handbook of Applied Cryptography, [CRC Press Series on Discrete Mathematices and Its Applications], CRC Press, Boca Raton, FL., US, pp. 543-590, XP001525013, ISBN: 978-0-8493-8523-0; retrieved from the internet: http://www.cacr.math uwaterloo.ca/hac/; paragraph 13.63.

* cited by examiner

METHOD FOR GENERATING AN IDENTIFIER

PRIORITY CLAIM

This application is a continuation of U.S. patent application Ser. No. 13/260,762 filed on Jan. 3, 2012, which is a 371 application of PCT/EP2010/058181 with an international filing date of Jun. 10, 2010, which claims benefit of foreign priority in accordance with 35 U.S.C. 119(b) to German application No. 10 2009 027 268.2 filed Jun. 29, 2009. These prior applications, including the entire written description and drawing figures, are hereby incorporated into the present application by reference.

BACKGROUND

The invention relates to a method for generating an identifier, a method for blocking a cryptographic device, a computer program product, a blocking system, and a computer system.

The use of various online services, for example for online shopping or for e-government applications, is known per se from the prior art. Typically, a user must identify himself to the computer system which provides the online service via the Internet, for example, using an authentication token. The authentication token may be a chip card or a USB stick, for example. If the authentication token is lost, the user must notify the computer system in question in order to block unauthorized use of the authentication token by third parties.

A system is known from US 2004/0123098 A1 which allows a third party to verify the existence of an association between a first party and a second party. The first party has a first and a second cryptographic key, and the second party has a third and a fourth cryptographic key. To allow the association to be verified, the second party generates a number which, together with a second, third, and fourth cryptographic key, defines a first, a second, and a third cryptographic parameter. By using these parameters and a second and third cryptographic key, the third party is able to verify an association between the first and second parties.

DE 10342710 A1 describes a device and a method for protecting electronic transactions which are carried out using a transaction identification means. At least one RFID tag which is read-only and a further security feature of the transaction identification means (for example, a number, an expiration date of the identification means, a hologram, a magnetic strip, etc.) are evaluated.

BRIEF DESCRIPTION OF THE DRAWINGS

Embodiments of the invention are explained in greater detail below with reference to the drawings, which show the following.

DESCRIPTION

Figure 1:
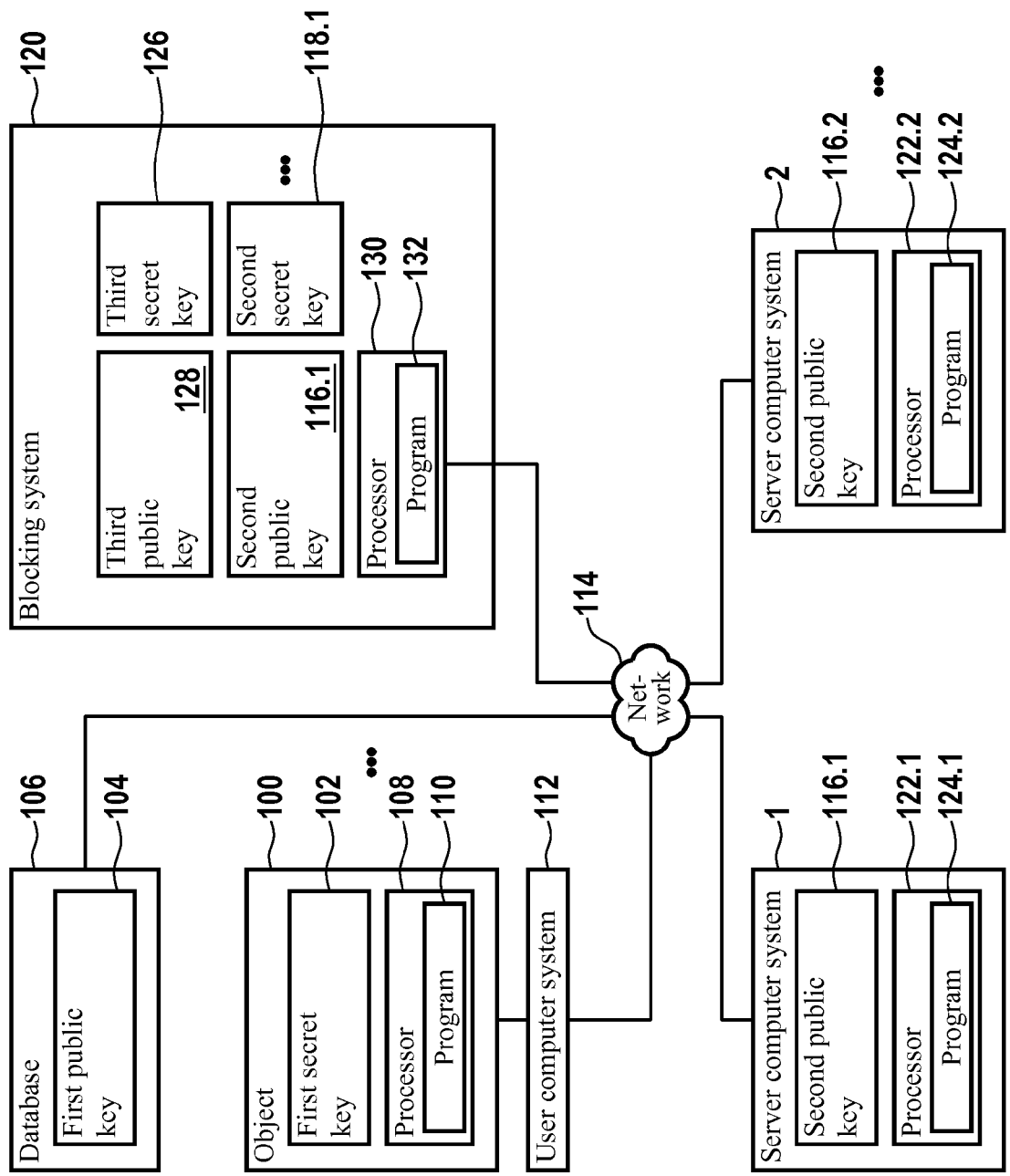
FIG. 1 shows a block diagram of a first embodiment of a blocking system according to the invention, and computer systems according to the invention.

In this regard, the object of the invention is to provide a method for generating an identifier, a method for blocking a cryptographic device, a computer program product, a blocking system, and a computer system.

The objects of the invention are achieved in each case by the features of the independent claims. Embodiments of the invention are stated in the dependent claims.

According to embodiments of the invention, a method is provided for generating an identifier for a pair, wherein the pair comprises a cryptographic device and a computer system, wherein the cryptographic device has a first secret key, wherein a second secret key is associated with the computer system, wherein a blocking system for accessing the second secret key of the computer system is provided, wherein the blocking system has a third secret key, and wherein the following steps are carried out for generating the identifier: Generating a second public key from the second secret key and a third public key associated with the third secret key by means of the blocking system, transmitting the second public key to the computer system, and generating the identifier from the first secret key and the second public key, using the cryptographic device.

Embodiments of the invention allow a "two-way computation" of the identifier. The identifier may be computed in two different ways: within the scope of the use, by communication between the object, i.e., the cryptographic device, and the computer system, and, within the scope of the blocking, by a blocking system and the computer system.

According to embodiments of the invention, within the scope of the use a query is made for a list of the blocked objects, which is specific to the particular computer system. This list is continuously updated with newly blocked objects.

According to embodiments of the invention, the following procedure is followed for using an object: 1) computing the identifier, 2) searching the list for blocked documents, 3) enabling use if the object is not blocked, or otherwise, refusing use.

The cryptographic device may be a document, in particular a value document or security document. In particular, the cryptographic device may be an electronic passport, an electronic personal identification card, or some other electronic identification document. For example, the cryptographic device may be designed as a chip card, a USB token, or some other portable device, or as a so-called security module.

According to the invention, a "document" is understood to mean in particular paper-based and/or plastic-based documents, for example identification documents, in particular passports, personal identification cards, and visas, and driver's licenses, vehicle identification documents, vehicle registration documents, company identification cards, health insurance cards, or other identification documents, as well as chip cards, payment means, in particular bank cards and credit cards, consignment notes, or other credentials, into which a data memory and a processor are integrated.

The cryptographic device preferably has a protected memory area in which the first secret key is stored. A first asymmetrical cryptographic key pair is formed by the first secret key and the first public key, whereby the first public key may likewise be stored in the cryptographic device and/or in a publicly accessible directory, for example in the database of a so-called directory server.

In particular, identification data may be associated with the first public key, the identification data together with the public key being stored in the database, so that with the aid of the identification data the first public key may be read from the database by a third party, in particular the blocking system. The identification data may also be contained in a certificate, which may be associated with the first asymmetrical cryptographic key pair. The identification data used as a database access key to the first public key may, for example, be the name and date of birth or the e-mail address of the carrier of the cryptographic device.

In the present context, a "certificate" is understood to mean a digital certificate, also referred to as a public key certificate. A certificate involves structured data which are used to associate a public key of an asymmetrical cryptosystem with an identity, such as that of a person, an organization, or a computer system, for example. For example, the certificate may correspond to the X.509 standard or some other standard.

According to embodiments of the invention, the communication between the computer system and the cryptographic device, in particular for using an online service provided by the computer system, takes place via a public network, whereby, for example, a user computer system, in particular a customary personal computer (PC), having a network interface and a reader may be used for this purpose. By means of the reader, such as a chip card reader or an RFID reader, for example, the cryptographic device is linked to the user computer system, which is provided via a network interface for establishing a communication connection, in particular a so-called session, with the computer system.

A mobile wireless device, in particular a mobile phone, may be used instead of a user computer system as a cryptographic device. In this case, the so-called Subscriber Identity Module (SIM), which may be designed according to the GSM, UMTS, or some other telecommunication standard, may be used. However, the mobile wireless device may also have an interface for a near field communication, in particular according to a Near Field Communication (NFC) standard, in order to access the cryptographic device.

According to one embodiment of the invention, the computer system transmits the second public key to the cryptographic device before an online service is provided. The cryptographic device then generates the identifier from the second public key and the first secret key, the identifier then being transmitted from the cryptographic device to the computer system. By means of the identifier, only the pair formed by the cryptographic device and the computer system, not the cryptographic device itself, is uniquely identified. This has the advantage in particular that the cryptographic device or its carrier may remain anonymous to the computer system.

According to one embodiment of the invention, the blocking system has a first subsystem and at least one second subsystem. Only the first subsystem has access to the third secret key, and only the second subsystem has access to the second secret key. However, both the third secret key and the second secret key are necessary for blocking the identifier, so that the blocking may be performed only with the aid of both the first and second subsystems, but not by either of the subsystems alone. It is thus possible to implement a "four eyes principle" for carrying out the blocking.

According to one embodiment of the invention, the cryptographic device may be used for a set of computer systems, each possible pair of the cryptographic device and one of these computer systems being uniquely identified by one identifier. Numerous other cryptographic devices of different users may be present, for which identifiers for all such pairs are likewise defined in a similar manner.

If one of the cryptographic devices is lost, it must be blocked for further use on all of the computer systems. For this purpose, a blocking command is directed to the first subsystem of the blocking system. The blocking command contains the identification data, so that the first subsystem is able to access the database in order to read the first public key of the cryptographic device to be blocked. Alternatively, the blocking command already contains the first public key, so that such access to the database is unnecessary.

The blocking command may be initiated, for example, by a call from the user to the blocking system by voice communication, or by electronic communication such as by e-mail, which contains the identification data, or by inputting the blocking command and/or the identification data on an Internet site of the blocking system.

The blocking system then generates all of the identifiers for all pairs which may be formed from the blocking device and the computer systems, and transmits these identifiers to the computer systems in question, so that in each case the identifiers are locally stored at those locations in blocking lists. If a subsequent attempt is made to use the cryptographic device for one of these computer systems, the computer system in question determines that the identifier received from the cryptographic device is identical to an identifier which appears on the blocking list, and as a result the computer system refuses provision of the desired online service.

This has the particular advantage that blocking of the cryptographic device is made possible by a single blocking command for all of the computer systems in question. Thus, the user does not have to contact every one of the computer systems in order to initiate the blocking there.

Embodiments of the invention are particularly advantageous for blocking cryptographic devices, for example identification documents, in particular those having no unique identifier, in a divided manner. One example scenario is an identification document which may be used for various computer systems of different providers of online services or online products.

For example, the same identification document may be used for providing authentication to an Internet auction platform, for example eBay, and for providing identification to an online store, for example Amazon. An identifier is computed from the first secret key of the identification document, for example a customer loyalty card, in combination with the second public key which is associated with eBay, the identifier being unique to the customer loyalty card-eBay combination. The eBay provider then has an identifier for the customer loyalty card-eBay pair without the need for further information from the customer loyalty card.

The same applies for Amazon, wherein the identifier computed for the customer loyalty card-Amazon pair is different from the identifier for the customer loyalty card-eBay pair. This prevents different providers, for example eBay and Amazon, from combining their data records regarding customer behavior, since they are not able to determine from the identifiers whether they are communicating with the same or different persons.

In another aspect, the invention relates to a method for blocking a cryptographic device, wherein an identifier corresponding to a method according to one of the preceding claims is associated with the pair comprising the cryptographic device and a computer system, by means of which the pair is identifiable, having the following steps: Computation of the identifier by the blocking device, based on the first public key, the second secret key, and the third secret key, transmission of the identifier to the computer system, and storage of the identifier in a blocking list of the computer system.

In another aspect, the invention relates to a computer program product for executing an embodiment of a method according to the invention for generating an identifier, and/or an embodiment of a method according to the invention for blocking a cryptographic device.

In another aspect, the invention relates to a blocking system for blocking the use of a cryptographic device with regard to a set of computer systems, wherein the cryptographic device has a first secret key, wherein one second secret key is associated with each of the computer systems, having: means for generating a second public key for each of the second secret keys from the second secret key in question and a third public key, wherein the third public key is included in a third secret key to which the blocking system has access, wherein an identifier is determinable by each of the second public keys and the first secret key of the cryptographic device, and identifies the pair comprising the cryptographic device and the computer system which is associated with the second public key in question, means for receiving a blocking command, means for generating the identifier for each of the pairs from the first public key of the cryptographic device, the second secret keys, and the third secret key, and means for transmitting the identifiers to the computer systems in question for storage in the blocking lists thereof.

In another aspect, the invention relates to a computer system having means for receiving a second public key from the blocking system, means for transmitting the second public key to a user computer system which is linked to the cryptographic device, means for receiving the identifier for the pair formed from the cryptographic device and the computer system, and means for comparing the identifier to a blocking list, wherein identifiers received from the blocking system due to the blocking command are stored in the blocking list.

The various functional means of the blocking system and/or of the computer system may be formed by one or more microprocessors which are designed to execute program instructions stored in a program memory in order to provide the particular functionality.

Corresponding elements of the various embodiments are denoted by the same reference numerals below.

FIG. 1 shows a data processing system comprising multiple server computer systems 1, 2, . . . . Each of the server computer systems 1, 2, . . . may be designed for providing an online service, for example as an online store, online auction platform, or e-government platform. An individual asymmetrical cryptographic key pair, which in each case is composed of a secret key and a public key, is associated with each of the server computer systems 1, 2, . . . . .

A cryptographic device 100 is designed for use with the server computer systems 1, 2, . . . . The cryptographic device 100 may be designed as an identification object, in particular as an identification document, for example a chip card, an RFID tag, or an electronic identification document.

The cryptographic device 100 has a protected memory area in which a first secret key 102 is stored. The first secret key 102 includes a first public key 104. A first asymmetrical cryptographic key pair is formed by the first secret key 102 and the first public key 104, by means of which the identity of the cryptographic device 100 is determined.

This key pair is unique for an object, i.e., the cryptographic device 100, but preferably is never used directly, and instead is used only as an input for computing the identifier.

The two systems, i.e., the cryptographic device 100 and the server computer system in question on the one hand, and the blocking system 120 and server computer system in question on the other hand, are able to compute the identifier, which is unique for the object and server computer system combination. The server computer system in question is able to store this identifier and optionally associate it with further information (for example, the name and bank account number of the carrier of the cryptographic device 100) with the aid of a database, and to recognize the object upon subsequent use.

The first public key 104 may be stored in a memory of the cryptographic device 100 and/or in a database 106. The database 106 may be designed as a so-called directory server. The identification data associated with the cryptographic device 100 may be used as an access key for the database 106. These identification data may be, for example, the name and date of birth, e-mail address, or the like of a carrier of the cryptographic device 100. In addition, a certificate associated with the first key pair may be stored in the database 106.

The cryptographic device 100 also has a processor 108 for executing program instructions 110. The processor 108 is designed for accessing the first secret key 102 in order to carry out a cryptographic operation by executing the program instructions 110.

The object 100 may be linked to a user computer system 112. For example, the user computer system 112 contains a reader, with the aid of which the user computer system 112 is able to communicate with the cryptographic device 100. The reader of the user computer system 112 may be designed as a chip card reader or an RFID reader, for example, depending on the type of communication interface the cryptographic device 100 has. However, the cryptographic device 100 may also form an integral component of the user computer system 112; in particular, the cryptographic device 100 may be designed as a so-called security module.

The user computer system 112 may also be designed as a mobile wireless device, for example a mobile phone. In this case the cryptographic device 100 may be a SIM card.

The cryptographic device 100 is linkable to the server computer systems 1, 2, . . . via the user computer system 112 and the network 114. The network 114 may be a private network, or a public network such as the Internet.

The server computer system 1 has a memory in which a second public key 116.1 is stored. A second secret key 118.1 is associated with the second public key 116.1; a second asymmetrical cryptographic key pair is formed by the second public key 116.1 and the second secret key 118.1, by means of which the server computer system 1 is identified. The second secret key 118.1 is stored in a blocking system 120. The blocking system 120 may be implemented by one or more interlinked computer systems; in addition, the blocking system 120 may include a call center, for example, so that a user may call that location to initiate blocking.

The server computer system 1 also contains at least one processor 122.1 for executing program instructions 124.1. The program instructions 124.1 contain a program module for providing an online service, and a program module for checking whether a blocking criterion is present.

The situation is the same for the server computer system 2, which stores a second public key 116.2 which is different from the second public key 116.1 of the server computer system 1. The second public key 116.2 includes a second secret key (not illustrated in FIG. 1) which, the same as the second secret key 118.1, is stored in the blocking system 120. Similarly as for the server computer system 1, the server computer system 2 also contains at least one processor 122.2 and program instructions 124.2.

Overall, a number I, which in principle may have any desired value, of such server computer systems i may be connected to the network 114, each of the server computer systems i storing an individual second public key 116.i which includes a second secret key 118.i that is stored in the blocking system 120.

A third secret key 126 is also stored in the blocking system 120. The blocking system 120 has access to a third public key 128; a third asymmetrical cryptographic key pair which is associated with the blocking system 120 is formed by the third secret key 126 and the third public key 128.

The blocking system 120 also has at least one processor 130 for executing program instructions 132. The blocking system 120 is able to carry out cryptographic operations by use of the program instructions 132. In particular, with the aid of the program instructions 132 the blocking system 120 is able to generate the second public key 116.1 from the second secret key 118.1, using the third public key 128.

The situation is the same for the additional second public key 116.i, which the blocking system 120 is likewise able to compute from the respective secret key 118.i and the third public key 128 by executing the program instructions 132.

The blocking system 120 is linkable to the database 106 and to the server computer systems i via the network 114.

The following procedure, for example, is followed for defining an identifier for a pair comprising, for example, the cryptographic device 100 and the server computer system i=1:

The blocking system 120 generates the second public key 116.1 from the second secret key 118.1 and the third public key 128, and transmits the second public key via the network 114 to the server computer system 1, which locally stores this second public key 116.1. The identifier for the cryptographic device 100/server computer system 1 pair is already defined by the second public key 116.1 and the first secret key 102. Similarly, the blocking system 120 generates the second public key 116.i for each additional server computer system i in order to define an identifier in each case for the cryptographic device 100/server computer system i pairs.

To use an online service which is provided by one of the server computer systems i, the user computer system 112 sends an appropriate request to this server computer system i. The server computer system i responds to such a request by means of its second public key 116.i, which is transmitted to the cryptographic device 100 via the network 114 and the user computer system 112.

By executing the program instructions 110, the cryptographic device 100 then computes the identifier for the cryptographic device 100/server computer system i pair from the first secret key 102 and the second public key 116.i. This identifier is then transmitted from the cryptographic device 100 to the particular server computer system i via the user computer system 112 and the network 114, thus identifying the association of the cryptographic device 100 or its carrier to the server computer system i.

The server computer system i is then able to store preferably secure data, for example, on the user computer system 112 in which this identifier is indicated. The cryptographic device 100 is identified via the identifier, i.e., uniquely with respect to the server computer system i, i.e., is uniquely distinguishable from other cryptographic devices which in principle have the identical design, and which may likewise be used for the data processing system, thus allowing the anonymity of the carrier of the cryptographic device 100 to be protected without having to disclose personal data or other data from the cryptographic device 100 to the server computer system i.

For example, the data contained in the identifier are stored on the user computer system 112 during a first session with the server computer system i. The same identifier is generated in a subsequent session between the same cryptographic device 100 and the same server computer system i, so that the server computer system i is able to associate the second session with the first session via the data indicated by the same identifier.

If the cryptographic device 100 is lost or becomes unusable for some other reason, for example because the first secret key 102 has been or could be divulged, further use of the cryptographic device 100 must be blocked with respect to the server computer systems i in order to prevent misuse. For this purpose, for example the user computer system 112 sends a blocking request to the blocking system 120 via the network 114, the blocking request containing identification data which allow the blocking system access to the first public key 104 by accessing the database 106 via the network 114. Alternatively, the blocking request which is sent to the blocking system 120 by the user computer system 112 already contains this first public key 104.

As a result of the blocking request, the blocking system 120 computes a fourth public key from the first public key 104 and the third secret key 126. The identifier for the cryptographic device 100/server computer system i pair is then computed from the fourth public key and the second secret key 118.i by executing the program instructions 132. The blocking system 120 then sends this identifier via the network 114 to the server computer system i, where this identifier is then stored in a blocking list.

When a subsequent attempt is made to use an online service provided by the server computer system i, using the cryptographic device 100, the server computer system i once again receives the identifier, which has been computed by the blocked cryptographic device 100, from the user computer system 112. The server computer system i compares the identifier received from the user computer system 112 to the identifiers stored in the blocking list.

Because the cryptographic device 100 has been previously blocked, the identifier computed by the cryptographic device 100 is present in this blocking list, so that the server computer system i recognizes the cryptographic device 100 as blocked. The server computer system i then delivers an error message to the user computer system 112 and refuses provision of the desired online service.

Due to the receipt of the blocking request from the user computer system 112, the blocking system 120 preferably computes the identifiers of all possible pairs of the cryptographic device 100 and the server computer systems i, and transmits same to the particular server computer systems i, each of which stores the identifier in question in its local blocking list. Thus, the cryptographic device 100 may be blocked from all of the server computer systems i based on a single blocking request.

Depending on the embodiment, the data processing system of FIG. 1 may be used by a plurality of users, each of which has a cryptographic device which corresponds to the cryptographic device 100 shown as an example in FIG. 1.

Figure 2:
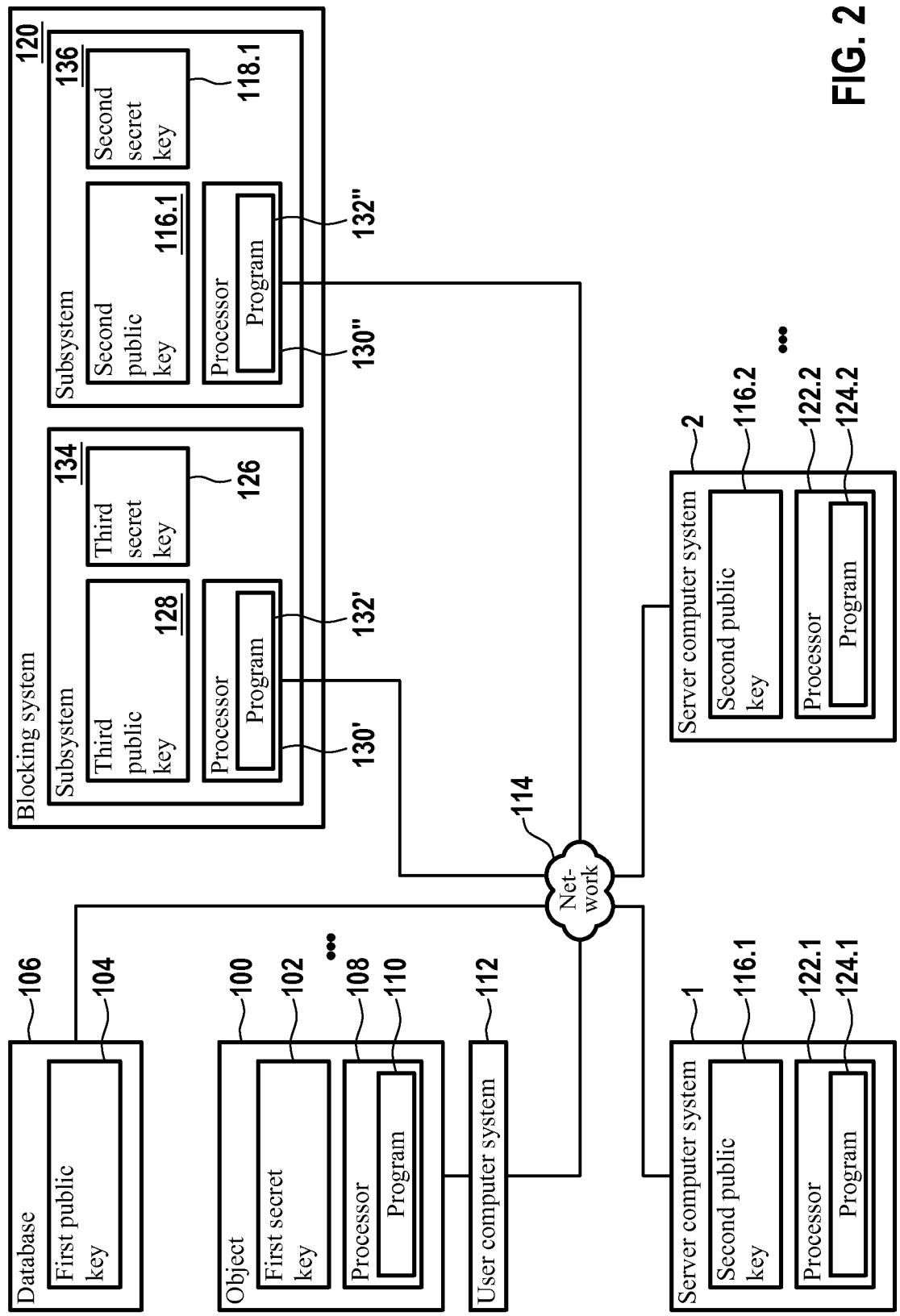
FIG. 2 shows a block diagram of a second embodiment of a blocking system according to the invention, and computer systems according to the invention.

FIG. 2 shows a refinement of the embodiment from FIG. 1. In FIG. 2, the blocking system 120 is formed by a first subsystem 134 and at least one second subsystem 136. The third secret key 126 is stored in the first subsystem 134; subsystem 134 includes at least one processor 130' for executing program instructions 132'. On the other hand, the second secret key 118.1 is stored in subsystem 136; in addition, further second secret keys of at least one subset of the server computer systems 1, 2, . . . may be stored in subsystem 136.

Subsystems 134 and 136 are loosely linked to one another, for example via the network 114.

For generating the second public key, for example the second public key 116.1, subsystem 136 uses the third public key 128 of subsystem 134, in that the third public key is transmitted from subsystem 134 to subsystem 136 via the network 114. On the other hand, for processing a blocking request, the fourth public key is computed by subsystem 134 by executing the program instructions 132', and is transmitted to subsystem 136 via the network 114, for example, where the identifier for the cryptographic device 100/server computer system 1 pair is computed from the fourth public key and the second secret key 118.1, using the program instructions 132". This identifier is then transmitted by subsystem 136 to the server computer system 1 in question via the network 114, so that the server computer system 1 is able to store this identifier in its blocking list.

It is particularly advantageous that access to both the second secret key 118.1 and the third secret key 126 is required for blocking the cryptographic device 100, so that neither subsystem 134 or 136 alone is able to carry out such blocking. It is thus possible to implement a "four eyes principle" for carrying out the blocking.

Figure 3:
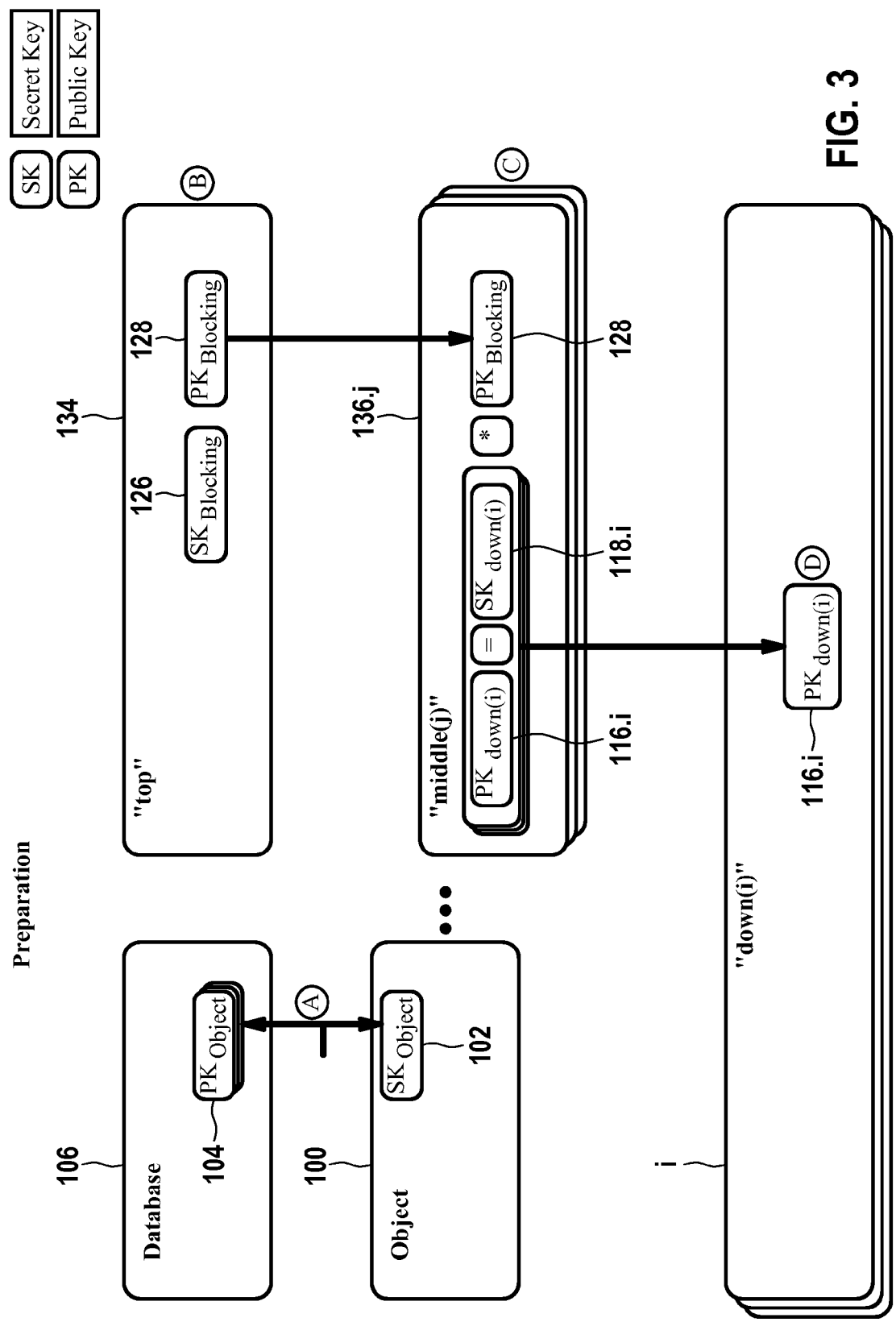
FIG. 3 shows one embodiment of a method according to the invention for generating an identifier.

FIG. 3 shows one embodiment of a corresponding method according to the invention, in which the preparation, i.e., the definition, of the identifiers for the server computer system i pairs is shown.

The first secret key 102 is denoted below as $SK_{object}$, and the first public key 104, as $PK_{object}$. The second public key 116.i is denoted below as $PK_{down(i)}$ and the second secret key 118.i, as $SK_{down(i)}$. The third public key 128 is denoted below as $PK_{blocking}$, and the third secret key 126, as $SK_{blocking}$. The key $PK_{object}$ is stored in the publicly accessible database 106, for example (step A), and the keys $PK_{blocking}$ and $SK_{blocking}$ are stored in subsystem 134, for example (step B).

The blocking system 120 is formed here by a single subsystem 134 and a set of J subsystems 136.j, where $1 \le j \le J$. In FIG. 3, subsystem 134 is denoted by "top," and subsystems 136.j, by "middle(j)." The server computer systems i are denoted by "down(i)" in FIG. 3.

In the embodiment considered here, the set of server computer systems i is divided into subsets, each of the subsystems 136.j being associated with such a subset of server computer systems i, and having the second secret keys $SK_{down(i)}$ of the subset in question.

For initializing the system, each of the server computer systems i receives a second public key $PK_{down(i)}$ from the appropriate subsystem 136.j, in that $PK_{down(i)}$ is computed from subsystem 136.j as follows (step C):

$$PK_{down(i)} = SK_{down(i)} \cdot PK_{blocking}$$

The symbol "·" preferably represents the operation of a cryptographically secure group. This may involve the multiplication of integers modulo a prime number, or the scalar multiplication of a point on an elliptical curve, i.e., adding the point $PK_{blocking}$ a total of $SK_{down(i)}$ times. The "·" operation is considered to be computable in an efficient manner, whereas the inverse operation (i.e., the solution of the Diffie-Hellman problem) is considered to be difficult to solve.

The key $PK_{down(i)}$ computed in this manner is then stored in the particular server computer system i (step D).

Figure 4:
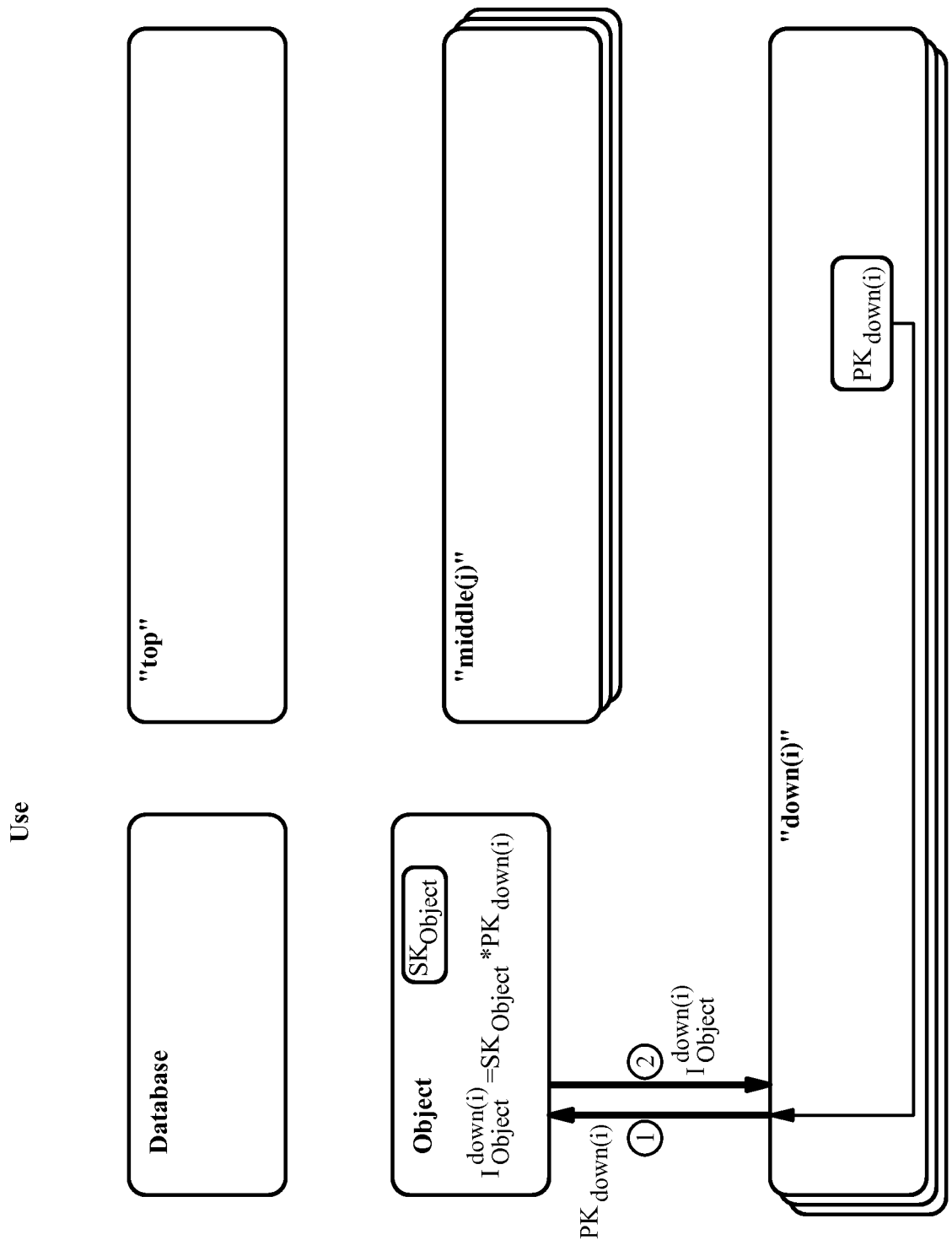
FIG. 4 shows one embodiment of a method according to the invention for using the identifier.

After the preparation according to FIG. 3, the use may be carried out according to FIG. 4 as follows: When one of the server computer systems i receives a service request from the user computer system 112 of the cryptographic device 100, the server computer system i sends its second public key $PK_{down(i)}$ to the cryptographic device 100, as shown in FIG. 4 (step 1). The cryptographic device 100 then computes the identifier for the cryptographic device 100/server computer system i pair from $PK_{down(i)}$ and the first secret key $SK_{object}$, this identifier being denoted below as $I_{object}^{down(i)}$, i.e., $$I_{object}^{down(i)} = SK_{object} \cdot PK_{down(i)}$$

This identifier $I_{object}^{down(i)}$ is then sent by the user computer system 112 to the server computer system i (step 2), so that the cryptographic device 100 is uniquely identified in its association with the server computer system i.

Figure 5:
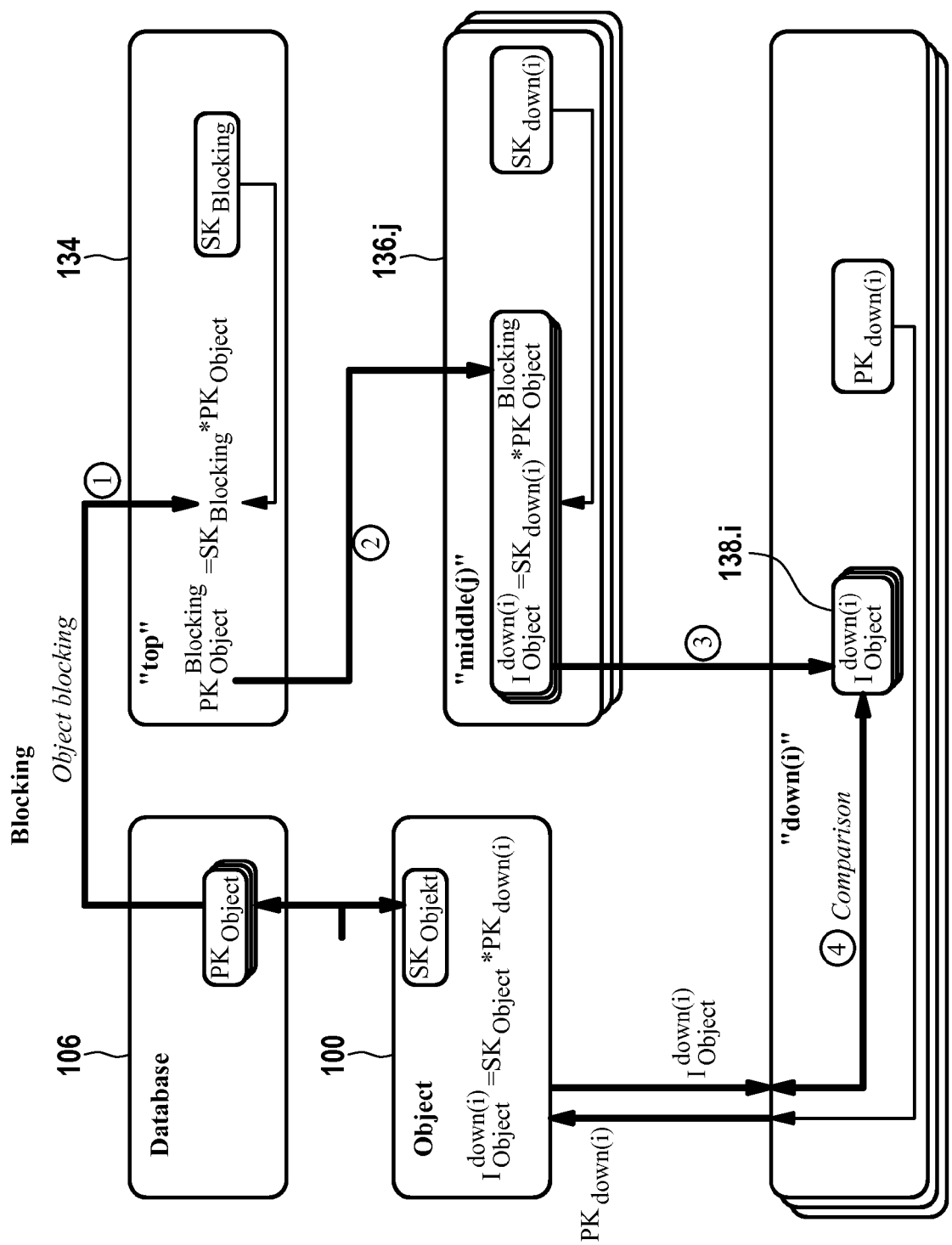
FIG. 5 shows one embodiment of a method according to the invention for blocking a cryptographic device.

FIG. 5 shows the sequence for blocking the cryptographic device 100. Subsystem 134 accesses the database 106, from which it reads out the first public key $PK_{object}$ of the cryptographic device 100 (step 1). Subsystem 134 then computes the fourth public key $PK_{object}^{blocking}$ from $PK_{object}$ and $SK_{blocking}$, i.e., $PK_{object}^{blocking} = SK_{blocking} \cdot PK_{object}$ Subsystem 134 transmits $PK_{object}^{blocking}$ to all of the second subsystems 136.j (step 2). Each of the subsystems 136.j then generates the identifiers $I_{object}^{down(i)}$ of the subsets of server computer systems, in each case associated with subsystems 136.j, and transmits these identifiers $I_{object}^{down(i)}$ in each case to the corresponding server computer systems i; i.e., the identifier $I_{object}^{down(i)}$ is transmitted by the appropriate subsystem 136.j to the server computer system i, where it is stored in the blocking list 138.i (step 3).

The identifier $I_{object}^{down(i)}$ is computed by subsystem 136.j as follows:

$$I_{object}^{down(i)} = SK_{down(i)} \cdot PK_{object}^{blocking}$$

When an attempt at use is made according to FIG. 4 after the cryptographic device 100 is blocked, after $I_{object}^{down(i)}$ is received from the cryptographic device 100 or from the user computer system 112, the server computer system i compares the received $I_{object}^{down(i)}$ to its blocking list 138.i (step 4). If this identifier $I_{object}^{down(i)}$ is contained in the blocking list 138.i, the server computer system i performs blocking so that it is not possible for the cryptographic device 100 to use the online service provided by the server computer system i. For example, the server computer system i signals the refusal of the service request received from the cryptographic device 100 or from the user computer system 112. On the other hand, if the received $I_{object}^{down(i)}$ is not contained in the blocking list 138.i, the server computer system i is able to provide the service requested by the service request.

The identifier $I_{object}^{down(i)}$ computed by subsystem 136.j within the scope of the blocking is identical to the identifier $I_{object}^{down(i)}$ computed by the cryptographic device 100, for the following reason:

The cryptographic device 100 computes $I_{object}^{down(i)}$ within the scope of the use as follows:

$$\begin{aligned} I_{object}^{down(i)} &= SK_{object} \cdot PK_{down(i)} \\ &= SK_{object} \cdot SK_{down(i)} \cdot PK_{blocking} \\ &= SK_{object} \cdot SK_{down(i)} \cdot SK_{blocking} \cdot G \end{aligned}$$

This is equal to $I_{object}^{down(i)}$ computed by subsystem 136.j for the blocking, namely $$I_{object}^{down(i)} = SK_{down(i)} \cdot PK_{object}^{blocking}$$
$$= SK_{down(i)} \cdot SK_{blocking} \cdot PK_{object}$$
$$= SK_{down(i)} \cdot SK_{blocking} \cdot SK_{object} \cdot G,$$

where G may be the so-called base point of an elliptical curve, i.e., the generator of the cryptographic group, and the "·" operator may be a scalar multiplication. Instead of elliptical curve cryptography, other cryptographic methods may be used, for example groups based on prime fields, in particular RSA.

LIST OF REFERENCE NUMERALS

- 100 Cryptographic device
- 102 First secret key
- 104 First public key
- 106 Database
- 108 Processor
- 110 Program instructions
- 112 User computer system
- 114 Network
- 116.1 Second public key
- 116.2 Second public key
- 118.1 Second secret key
- 120 Blocking system
- 122.1 Processor
- 122.2 Processor
- 124.1 Program instructions
- 124.2 Program instructions
- 126 Third secret key
- 128 Third public key
- 130 Processor
- 130' Processor
- 130" Processor
- 132 Program instructions
- 132' Program instructions
- 132" Program instructions
- 134 Subsystem
- 136 Subsystem

What is claimed:

1. A system for blocking the use of a cryptographic device with regard to a set of one or more computer systems, wherein the cryptographic device has a first secret key, the first secret key and a first public key forming an asymmetric cryptographic key pair, wherein each computer system of the set of one or more computer systems is associated with a second secret key, the system comprising:
   a blocking subsystem comprising:
   a memory for storing the second secret keys associated with the set of one or more computer systems; and
   a hardware processor coupled to the memory and configured to:
   receive a blocking command for the cryptographic device;
   for each computer system of the set of one or more computer systems:
   generate a second public key associated with the computer system by combining the second secret key associated with the computer system with a third public key;
   transmit the second public key to the cryptographic device;
   generate a first identifier by combining the first public key of the cryptographic device with the second secret key associated with the computer system and a third secret key; and
   transmit the first identifier to the computer system for storage in a respective blocking list thereof;
   wherein the blocking subsystem is able to access to the third secret key, the third secret key and the third public key forming an asymmetric cryptographic key pair; and
   a computer system configured to:
   receive the first identifier from the blocking subsystem;
   store the first identifier in the blocking list in a memory of the computer system, the blocking list comprising one or more first identifiers;
   receive a second identifier from the cryptographic device, where the second identifier comprises a combination of the first secret key of the cryptographic device with the second public key associated with the computer system;
   compare the second identifier to one or more first identifiers stored in the blocking list, and
   block the cryptographic device if the second identifier matches a first identifier of the one or more first identifiers stored in the blocking list.

2. The system according to claim 1, wherein the blocking subsystem comprises a first subsystem and a second subsystem, wherein only the first subsystem has access to the third secret key, and only the second subsystem has access to the second secret key, wherein the second subsystem is provided for generating the second public key from the second secret key and the third public key.

3. The system according to claim 2, wherein the blocking command is received by the first subsystem wherein the blocking command contains identification data for identifying the cryptographic device, and wherein the first subsystem is designed to access a database with the aid of the identification data in order to read the first public key of the identifier from the database.

4. The system according to claim 1, further comprising: a cryptographic device comprising a hardware processor and a memory, wherein the hardware processor and memory of the cryptographic device are configured to:
   receive a second public key of the one or more second public keys associated with the set of one or more computer systems from the blocking subsystem; and
   determine the second identifier associated with the received second public key by combining the received second public key and the first secret key of the cryptographic device.

5. The system according to claim 4, wherein the hardware processor of the cryptographic device is further configured to:
   transmit the second identifier to the computer system of the set of one or more computer systems associated with the received second public key.

6. A method for blocking the use of a cryptographic device with regard to a set of one or more computer systems, wherein the cryptographic device has a first secret key, the first secret key and a first public key forming an asymmetric cryptographic key pair, wherein each computer system of the set of one or more computer systems is associated with a second secret key of a set of second secret keys, the method comprising:

storing, by a blocking subsystem, the second secret keys associated with the set of one or more computer systems, wherein the blocking subsystem has access to a third secret key, the third secret key and a third public key forming an asymmetric cryptographic key pair;

receiving, by the blocking subsystem, a blocking command for the cryptographic device;

for each computer system of the set of one or more computer systems:
  generating, by the blocking subsystem, a second public key associated with the computer system by combining the second secret key with the third public key;
  transmitting, by the blocking subsystem, the second public key to the cryptographic device;
  generating, by the blocking subsystem, a first identifier by combining the first public key of the cryptographic device with the second secret key associated with the computer system and the third secret key;
  transmitting, by the blocking subsystem, the first identifier to the computer system for storage in a respective blocking list thereof;

receiving, by a computer system of the set of one or more computer systems, the first identifier from the blocking system;

storing, by the computer system, the first identifier in the blocking list in a memory of the computer system, the blocking list comprising one or more first identifiers;

receiving, by the computer system, a second identifier from the cryptographic device, where the second identifier comprises a combination of the first secret key of the cryptographic device with the second public key associated with the computer system;

comparing, by the computer system, the second identifier to one or more first identifiers stored in the blocking list, and blocking, by the computer system, the cryptographic device if the second identifier matches a first identifier of the one or more first identifiers stored in the blocking list.

7. The method of claim 6, wherein the blocking system comprises a first subsystem and a second subsystem, wherein only the first subsystem has access to the third secret key, and only the second subsystem has access to the second secret key, the method further comprising:
  the first subsystem generating the first identifier for each possible cryptographic device/computer system pair by combining the first public key of the cryptographic device, the second secret keys, and the third secret key; and
  the second subsystem generating the second public key by combining the second secret key and the third public key.

8. The method of claim 7, wherein the blocking command is received by the first subsystem and wherein the blocking command contains identification data for identifying the cryptographic device, the method further comprising:
  the first subsystem accessing a database dependent upon the identification data in order to read the first public key of the identifier from the database.

9. The method according to claim 7, further comprising:
  generating, by the first subsystem, a fourth public key by combining the third secret key and the first public key; and
  transmitting the fourth public key from the first subsystem to the second subsystem.

10. The method according to claim 7, wherein the blocking subsystem comprises a plurality of second subsystems each being associated with a computer system of the set of computer systems, the method further comprising:
  generating, by a second subsystem of the plurality of second subsystems, the first identifier for the computer system with which the second subsystem is associated by combining the fourth public key and the second secret key of the associated computer system.

11. The method according to claim 10, further comprising:
  responsive to a blocking command, the first subsystem generating the fourth public key and transmitting the fourth public key to the plurality of second subsystems;
  determining, by the plurality of second subsystems, a first identifier for each possible cryptographic device/computer system pair; and
  transmitting, by the plurality of second subsystems, the first identifiers to the associated computer systems, so that in each of the computer systems the first identifier which identifies the pair containing the computer system and the cryptographic device is stored in the respective blocking list of the computer system.

12. The method of claim 6, further comprising:
  the cryptographic device receiving the second public key, associated with a computer system of the set of one or more computer systems, from the blocking system;
  the cryptographic device generating the second identifier by combining the second public key with the first secret key; and
  the cryptographic device transmitting the second identifier to the computer system, of the set of one or more computer systems, associated with the second public key.

13. The method according to claim 12, wherein the cryptographic device comprises a value document or security document.

14. The method according to claim 12, wherein the cryptographic device comprises a chip card.

* * * * *